United States Patent
Xu et al.

(10) Patent No.: US 12,382,086 B2
(45) Date of Patent: Aug. 5, 2025

(54) METHODS AND APPARATUSES FOR VIDEO CODING

(71) Applicant: Tencent America LLC, Palo Alto, CA (US)

(72) Inventors: Meng Xu, San Jose, CA (US); Xiang Li, Saratoga, CA (US); Xiaozhong Xu, State College, PA (US); Guichun Li, Milpitas, CA (US); Shan Liu, San Jose, CA (US); Xin Zhao, Santa Clara, CA (US)

(73) Assignee: Tencent America LLC, Palo Alto, CA (US)

( * ) Notice: Subject to any disclaimer, the term of this patent is extended or adjusted under 35 U.S.C. 154(b) by 164 days.

(21) Appl. No.: 17/500,376

(22) Filed: Oct. 13, 2021

(65) Prior Publication Data

US 2022/0038736 A1  Feb. 3, 2022

Related U.S. Application Data

(63) Continuation of application No. 16/698,322, filed on Nov. 27, 2019, now Pat. No. 11,197,017.

(Continued)

(51) Int. Cl.
*H04N 19/52* (2014.01)
*H04N 19/56* (2014.01)
(Continued)

(52) U.S. Cl.
CPC ............ *H04N 19/52* (2014.11); *H04N 19/56* (2014.11); *H04N 19/577* (2014.11); *H04N 19/70* (2014.11)

(58) Field of Classification Search
CPC ...... H04N 19/52; H04N 19/56; H04N 19/577; H04N 19/70
See application file for complete search history.

(56) References Cited

U.S. PATENT DOCUMENTS

| 10,986,360 B2 * | 4/2021 | Thirumalai ............ H04N 19/56 |
| 2012/0230392 A1 * | 9/2012 | Zheng .................. H04N 19/196 |
| | | 375/E7.256 |

(Continued)

FOREIGN PATENT DOCUMENTS

| CN | 103430540 A | 12/2013 |
| WO | 2018064524 A1 | 4/2018 |
| WO | WO-2020003279 A1 * | 1/2020 ........... H04N 19/105 |

OTHER PUBLICATIONS

Chinese Office Action issued Feb. 23, 2023 in Application No. 201980078879.2 with English Translation, 26 pages.

(Continued)

*Primary Examiner* — Mohammad J Rahman
(74) *Attorney, Agent, or Firm* — ArentFox Schiff LLP

(57) ABSTRACT

Aspects of the disclosure provide methods and apparatuses for video encoding/decoding. An apparatus for video decoding includes processing circuitry that decodes prediction information for a current block in a current coded picture. The prediction information indicates a motion vector predictor index (MVP_idx) for selecting a motion vector predictor in a motion vector predictor list. The processing circuitry determines whether the MVP_idx is smaller than a threshold. When the MVP_idx is determined to be smaller than the threshold, the processing circuitry decodes a motion vector difference (MVD) corresponding to the motion vector predictor and reconstructs the current block based on the motion vector predictor and the MVD. When the MVP_idx is determined to be equal to or larger than the threshold, the processing circuitry reconstructs the current block based on the motion vector predictor without the MVD which is not signaled in the coded video sequence.

18 Claims, 16 Drawing Sheets

Related U.S. Application Data

(60) Provisional application No. 62/787,044, filed on Dec. 31, 2018, provisional application No. 62/776,350, filed on Dec. 6, 2018.

(51) Int. Cl.
*H04N 19/577* (2014.01)
*H04N 19/70* (2014.01)

(56) References Cited

U.S. PATENT DOCUMENTS

| | | | |
|---|---|---|---|
| 2012/0320984 | A1 | 12/2012 | Zhou |
| 2013/0229485 | A1 | 9/2013 | Rusanovskyy et al. |
| 2013/0272377 | A1 | 10/2013 | Karczewicz et al. |
| 2014/0286427 | A1 | 9/2014 | Fukushima et al. |
| 2014/0355666 | A1* | 12/2014 | Zhang ............ H04N 19/52 375/240.02 |
| 2015/0334405 | A1 | 11/2015 | Rosewarne et al. |
| 2016/0366435 | A1 | 12/2016 | Chien |
| 2018/0098089 | A1 | 4/2018 | Chen et al. |
| 2018/0278951 | A1 | 9/2018 | Seregin et al. |
| 2018/0324437 | A1 | 11/2018 | Kim |
| 2019/0124350 | A1* | 4/2019 | Thirumalai ............ H04N 19/52 |
| 2020/0236362 | A1 | 7/2020 | Lee |
| 2020/0260072 | A1* | 8/2020 | Park ............ H04N 19/132 |
| 2023/0354417 | A1 | 11/2023 | Kim et al. |

OTHER PUBLICATIONS

PCT Notification of Transmittal of the International Search Report and the Written Opinion of the International Searching Authority, or the Declaration Issued on Feb. 12, 2020 in application PCT/2019/084851, (20 pages.

Kim et al.—"AHG5: Context reduction for MVD coding", Joint Collaborative Team on Video Coding (JCT-VC) of ITU-T SG 16 WP 3 and ISO/IEC JTC 1/SC 29/WG 11, 10$^{th}$ Meeting: Stockholm, SE Jul. 11-20, 2012, Document: JCTVC-J0315.

Chen et al.—"Algorithm description for Versatile Video Coding and Test Model 3 (VTM 3)", Joint Video Experts Team (JVET) of ITU-T SG 16 WP 3 and ISO/IEC JTC 1/SC 29/WG 11, 12$^{th}$ Meeting: Macao, CN Oct. 3-12, 2018, Document: JVET-L1002-v1.

Office Action dated Dec. 1, 2021 issued in corresponding European patent application No. 19891954.0.

Supplementary European Search Report issued Feb. 11, 2022 in Application No. 19891954.0.

Samuelsson J et al., "EE5: Improved MV coding", 116. MPEG Meeting; Oct. 14, 2016-Oct. 21, 2016; Chengdu; (Motion Picture Expert Group or ISO/IEC JTC1/SC29/WG11), No. m39056, Oct. 5, 2016.

Bross B et al., "Versatile Video Coding (Draft 3)", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L1001, Dec. 3, 2018.

* cited by examiner

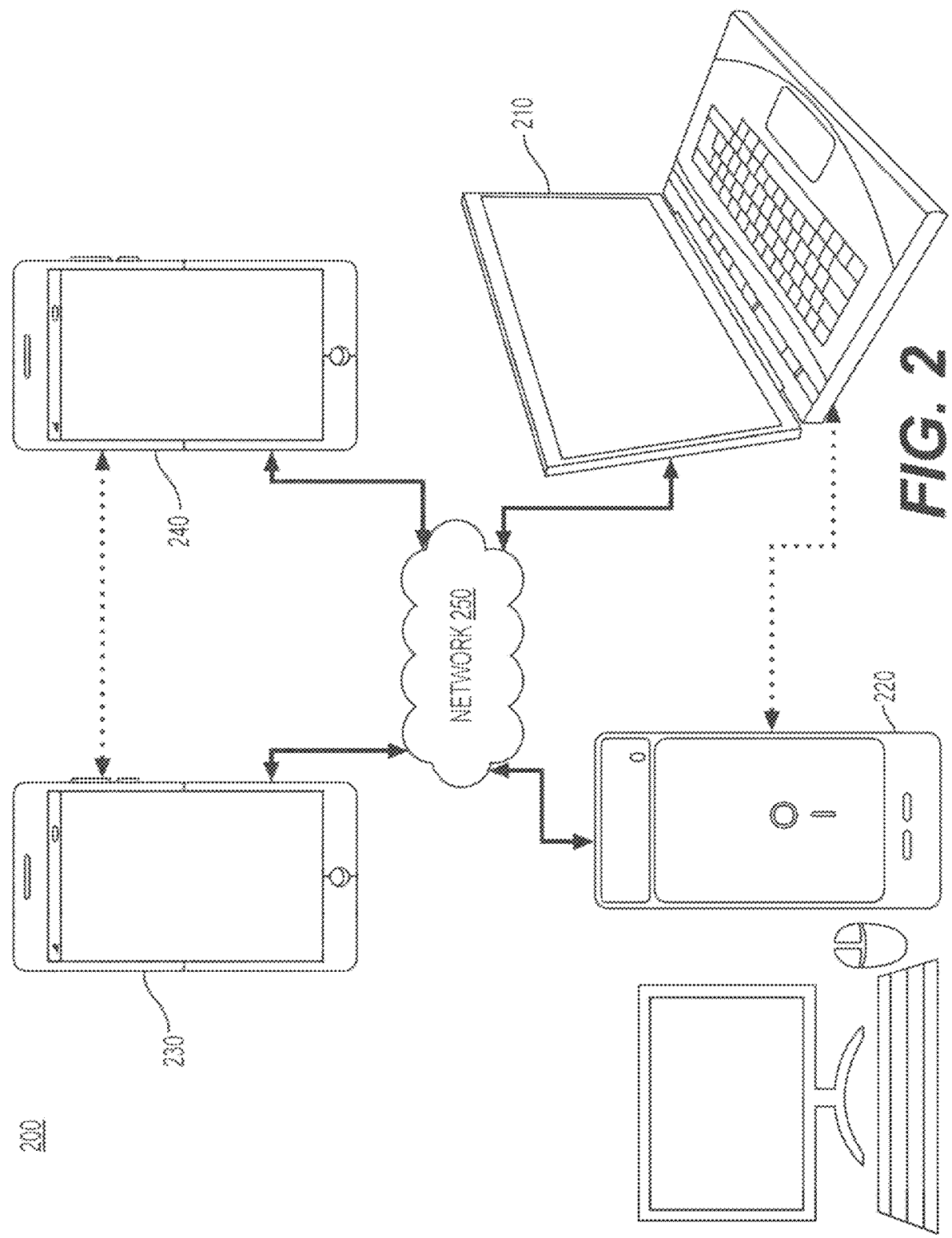

| | Descriptor |
|---|---|
| if( inter_pred_idc[ x0 ][ y0 ] != PRED_L1 ) { | |
|   if( num_ref_idx_l0_active_minus1 > 0 ) | |
|     ref_idx_l0[ x0 ][ y0 ] | ae(v) |
|   mvd_coding( x0, y0, 0, 0 ) | |
|   if( MotionModelIdc[ x0 ][ y0 ] > 0 ) | |
|     mvd_coding( x0, y0, 0, 1 ) | |
|   if( MotionModelIdc[ x0 ][ y0 ] > 1 ) | |
|     mvd_coding( x0, y0, 0, 2 ) | |

FIG. 9A

| | Descriptor |
|---|---|
| mvd_coding( x0, y0, refList, cpIdx ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

FIG. 9B

| | Descriptor |
|---|---|
| mvd_coding(x0, y0, refList ,cpIdx ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) { | |
|     abs_mvd_minus1[ 0 ] | ae(v) |
|     mvd_sign_flag[ 0 ] | ae(v) |
|   } | |
|   if( abs_mvd_greater0_flag[ 1 ] ) { | |
|     abs_mvd_minus1[ 1 ] | ae(v) |
|     mvd_sign_flag[ 1 ] | ae(v) |
|   } | |
| } | |

*FIG. 10*

METHODS AND APPARATUSES FOR VIDEO CODING

INCORPORATION BY REFERENCE

This application is a continuation of application Ser. No. 16/698,322, filed Nov. 27, 2019, which claims the benefit of priority to U.S. Provisional Application No. 62/776,350, "FLEXIBLE MOTION VECTOR PREDICTION" filed on Dec. 6, 2018, and U.S. Provisional Application No. 62/787,044, "IMPROVED MOTION VECTOR DIFFERENCE CODING" filed on Dec. 31, 2018, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate) of, for example, 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application, ln the case of video, lossy compression is widely employed. The amount of distortion tolerated depends on the application; for example users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding, in intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In sonic cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may be predicted itself.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted, The arrows represent the direction from which the sample is being predicted. For example, arrow (102) indicates that sample (101) is predicted from a sample or samples to the upper right, at a 45 degree angle from the horizontal. Similarly, arrow (403) indicates that sample (101) is predicted from a sample or samples to the lower karat of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, Each sample is labelled with an "S", its position in the Y dimension (e.g., row index), and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially When the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted front neighboring directions used in neighboring, already decoded, blocks.

FIG. 1B shows a schematic (105) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will in a well working video coding technology, be represented by a larger number of bits than more likely directions.

Motion compensation can be a lossy compression technique and can relate to techniques where a block of sample data from a previously reconstructed picture or pan thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs, can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV decoding order. Doing so can substantially reduce the amount of data required for coding e MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring areas. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived, from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, advanced motion vector prediction (AMVP) mode and merge mode are described here.

In AMVP mode, motion information of spatial and temporal neighboring blocks of a current block can be used to predict motion information of the current block, while the prediction residue is further coded. Examples of spatial and temporal neighboring candidates are shown in FIG. 1C and FIG. 1D, respectively. A two-candidate motion vector predictor list is formed. The first candidate predictor is from the first available motion vector of the two blocks A0 (112), A1 (113) at the bottom-left corner of the current block (111), as shown in FIG. 1C. The second candidate predictor is from the first available motion vector of the three blocks B0 (114), B1 (115), and B2 (116) above the current block (111). If no valid motion vector can be found from the checked locations, no candidate will be tilled in the list. If two available candidates have the same motion information, only one candidate will be kept in the list. If the list is not full, i.e., the list does not have two different candidates, a temporal co-located motion vector (after scaling) from C0 (122) at the bottom right corner of a co-located block (121) in a reference picture will be used as another candidate, as shown in FIG. 1D. If motion information at C0 (122) location is not available, the center location C1 (123) of the co-located block in the reference picture will be used instead. In the above derivation, if there are still not enough motion vector predictor candidates, a zero motion vector will be used to fill up the list, Two flags mvp_10_flag and mvp_11_flag are signaled in the bitstream to indicate the AMVP index (0 or 1) for MV candidate list L0 and L1, respectively.

In a merge mode for inter-picture prediction, if a merge flag (including a skip flag) is signaled as TRUE, a merge index is then signaled to indicate which candidate in a merge candidate list will be used to indicate the motion vectors of the current block. At the decoder, the merge candidate list is constructed based on spatial and temporal neighbors of the current block. As shown in FIG. 1C, up to four MVS derived from five spatial neighboring blocks (A0-B2) are added into the merge candidate list. In addition, as shown in FIG. 1D, up to one MV from two temporal co-located blocks (C0 and C1) in the reference picture is added to the list. Additional merge candidates include combined bi-predictive candidates and zero motion vector candidates. Before taking the motion information of a block as a merge candidate, redundancy checks are performed to check whether it is identical to an element in the current merge candidate list. If it is different from each element in the current merge candidate list, it will be added to the merge candidate list as a merge candidate. MaxMergeCandsNum is defined as the size of the merge candidate list in terms of candidate number. In HEVC, MaxMergeCandsNum is signaled in the bitstream. A skip mode can be considered as a special merge mode with zero residual.

In VVC, a sub-block based temporal motion vector prediction (SbTMVP) method, similar to the temporal motion vector prediction (TMVP) in HEVC, can use the motion field in the collocated picture to improve motion vector prediction and merge mode for CUs in the current picture. The same collocated picture used by TMVP is used for SbTMVP. SbTMVP differs from TMVP in the following two main aspects: (1) TMVP predicts motion at CU level but SbTMVP predicts motion at sub-CU level; and (2) whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

The SbTMVP process is illustrated in FIG. 1E and FIG. 1F. SbTMVP predicts the motion vectors of the sub-CUs within the current CU in two steps. In the first step, as shown in FIG. 1E, the spatial neighbors of a current block (131) are examined in the order of A1 (132), B1 (133), B0 (134), and A0 (135). Once the first available spatial neighboring block that has a motion vector that uses the collocated picture as its reference picture is identified, this motion vector is selected to be the motion shift to be applied. If no such motion vector is identified from the spatial neighbors, then the motion shift is set to (0, 0).

In the second step, the motion shift identified in the first step is applied (i.e., added to the coordinates of the current block) to obtain sub-CU-level motion information (e.g., motion vectors and reference indices) from the collocated picture as shown in FIG. 1E. The example in FIG. 1F assumes the motion shift (149) is set to the motion vector of the spatial neighboring block A1 (143). Then, for a current sub-CU (e.g., sub-CU (144)) in the current block (142) of the current picture (141), the motion information of a corresponding collocated sub-CU (e.g., collocated sub-CU (154)) in the collocated block (152) of the collocated picture (151) is used to derive the motion information for the current sub-CU. The motion information of the corresponding collocated sub-CU (e.g. collocated sub-CU (154)) is converted to the motion vectors and reference indices of the current sub-CU (e.g., sub-CU (144)) in a similar way as the TMVP process in HEVC, where temporal motion scaling is applied, to align the reference pictures of the temporal motion vectors to the reference picture of the current CU.

In VVC, a combined sub-block based merge list which contains both a SbTMVP candidate and affine merge candidates can be used in sub-block based merge mode. The SbTMVP mode is enabled/disabled by a sequence parameter set (SPS) flag. If the SbTMVP mode is enabled, the SbTMVP predictor is added as the first entry of the sub-block based merge list, and followed by the affine merge candidates. The maximum allowed size of the sub-block based merge list is 5 in some applications. The sub-CU size used in SbTMVP is fixed to be 8×8, for example. As done for affine merge mode, SbTMVP mode is only applicable to a CU when both width and height are larger than or equal to 8.

The encoding logic of an additional SbTMVP merge candidate is the same as the encoding logic for other merge candidates. That is, for each CU in a P or B slice, an additional rate distortion (RD) check is performed to decide whether to use the SbTMVP candidate.

In VVC, a history-based MVP (HMVP) method includes a HMVP candidate that is defined as the motion information of a previously coded block. A table with multiple HMVP candidates is maintained during the encoding/decoding process. The table is emptied when a new slice is encountered. Whenever there is an inter-coded non-affine block, the associated motion information is added to the last entry of the table as a new HMVP candidate. The coding flow of the HMVP method is depicted in FIG. 1G.

The table size S is set to be 6, which indicates up to 6 HMVP candidates may be added to the table. When inserting a new motion candidate into the table, a constrained FIFO rule is utilized such that a redundancy check is first applied to determine whether an identical HMVP is in the table. If found, the identical HMVP is removed from the table and all the HMVP candidates afterwards are moved forward, i.e., with indices reduced by 1. FIG. 1H shows an example of inserting a new motion candidate into the HMVP table.

HMVP candidates could be used in the merge candidate list construction process. The latest several HMVP candidates in the table are checked in order and inserted into the candidate list after the TMVP candidate. Pruning, is applied on the HMVP candidates to the spatial or temporal merge candidate excluding sub-block motion candidate (i.e., ATMVP).

To reduce the number of pruning operations, the number of HMVP candidates to be checked (denoted by L) is set as $L=(N<=4)?\ M:\ (8-N)$, where N indicates a number of available non-sub-block merge candidates and M indicates a number of available HMVP candidates in the table. In addition, once the total number of available merge candidates reaches the signaled maximally allowed merge candidates minus 1, the merge candidate list construction process from the HMVP candidate list is terminated. Moreover, the number of pairs for combined bi-predictive merge candidate derivation is reduced from 12 to 6.

HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. In some applications, K is set to 4 while the AMVP candidate list size is kept unchanged, i.e., equal to 2.

Pairwise average candidates are generated by averaging predefined pairs of candidates in the current merge candidate list. In VVC, the number of pairwise average candidates is 6, and the predefined pairs are defined as {(0, 1) (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures. If only one motion vector is available, the one motion vector is directly used. If no motion vector is available, this list is considered as invalid. The pairwise average candidates can replace the combined candidates in the HEVC standard.

Multi-hypothesis prediction is applied to improve uni-prediction of AMVP mode. One flag is signaled to enable or disable multi-hypothesis prediction. Moreover, one additional merge index, is signaled when the flag is true. In this way, multi-hypothesis prediction turns uni-prediction into bi-prediction, where one prediction is acquired using the original syntax elements in AMVP mode while the other prediction is acquired using the merge mode. The final prediction uses 1:1 weights to combine these two predictions as in bi-prediction. The merge candidate list is first derived from merge mode with sub-CU candidates (e.g., affine, alternative temporal motion vector prediction (ATMVP)) excluded. Next, the merge candidate list is separated into two individual lists, one for list 0 (L0) containing all L0 motions from the candidates, and the other for list 1 (L1) containing: all L1 motions. After removing redundancy and filling vacancy, two merge lists are generated for L0 and L1, respectively. There are two constraints when applying multi-hypothesis prediction for improving AMVP mode. First, it is enabled for those CUs with the luma coding block (CB) area larger than or equal to 64. Second, it is only applied to L1 for low delay B pictures.

SUMMARY

Aspects of the disclosure provide methods and apparatuses for video encoding/decoding. In some examples, an apparatus for video decoding includes processing circuitry that decodes prediction information for a current block in a current coded picture that is part of a coded video sequence. The prediction information indicates a motion vector predictor index for selecting a motion vector predictor in a motion vector predictor list. The processing circuitry determines whether the motion vector predictor index is smaller than a threshold. When the motion vector predictor index is determined to be smaller than the threshold, the processing circuitry decodes a motion vector difference (MVD) corresponding to the motion vector predictor and reconstructs the current block based on the motion vector predictor and the MVD.

In some embodiments, when the motion vector predictor index is determined to be equal to or larger than the threshold, the processing circuitry reconstructs the current block based on the motion vector predictor without the MVD which is not signaled in the coded video sequence.

In some embodiments, the processing circuitry determines a reference picture in a reference picture list for the current block according to one of a reference index to the reference picture in the reference picture list and a reference picture associated with the motion vector predictor.

In an embodiment, the threshold is a preset number. In another embodiment, the threshold is signaled in the coded video sequence.

In some embodiments, the processing circuitry determines whether an inter-prediction hypothesis of a new motion vector predictor is different from an inter-prediction hypothesis of the motion vector predictor list.

In some embodiments, the motion vector predictor index is smaller than the threshold when the current block has one reference picture list.

In some embodiments, the motion vector predictor list includes a motion vector predictor associated with a non-zero MVD and a motion vector predictor associated with a zero MVD.

According to aspects of the disclosure, an apparatus for video decoding, includes processing circuitry that decodes prediction information for a current block in a current picture that is a part of a coded video sequence. The prediction information indicates a first motion vector difference (MVD) corresponding to a first motion vector predictor in a first motion vector predictor list and a plurality of syntax elements associated with the first MVD. No more than one of the plurality of syntax elements is context coded. The processing circuitry decodes the first MVD according to the plurality of syntax elements and reconstructs the current block based on the first MVD and the first motion vector predictor.

In some embodiments, a total number of the plurality of syntax elements associated with the first MVD is smaller than four.

In some embodiments, one of the plurality of syntax elements associated with the first MVD has a first component and a second component, and the second component is decoded based on the first component.

In some embodiments, when the prediction information indicates a bi-directional prediction mode for the current block, the processing, circuitry further decodes a second MVD corresponding to a second motion vector predictor in a second motion vector predictor list based on the first MVD. The processing circuitry reconstructs the current block based on the first motion vector predictor, the first MVD, the second motion vector predictor, and the second MVD.

In some embodiments, when the prediction information indicates a first affine mode for the current block and the first motion vector predictor corresponds to a first control point of the current block, the processing circuitry decodes a third MVD corresponding to a third motion vector predictor based on the first MVD. The third motion vector predictor corresponds to a second control point of the current block. The processing circuitry hurdler reconstructs the current block based on the first motion vector predictor, the first MVD, the third motion vector predictor, and the third MVD.

In some embodiments, when the prediction information indicates a second affine mode with bi-directional prediction for the current block, the processing circuitry decodes a fourth MVD corresponding to a fourth motion vector predictor in a fourth motion vector predictor list based on the first MVD. The fourth motion vector predictor and the first motion vector predictor correspond to a same control point of the current block. The processing circuitry reconstructs the current block based on the first motion vector predictor, the first MVD, the fourth motion vector predictor, and the fourth MVD.

Aspects of the disclosure also provide one or more non-transitory computer-readable mediums storing instructions which when executed by a computer for video decoding cause the computer to perform any one of a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 2 is a schematic illustration of a simplified block diagram of a communication system in accordance with an embodiment;

FIG. 9A shows a syntax table for coding an MVD for list 0 (L0) or bi-prediction according to some embodiments of the disclosure;

FIG. 9B shows a syntax table for an MVD coding according to some embodiments of the disclosure;

FIG. 10 shows a syntax table for an MVD coding according to an embodiment of the disclosure;

DETAILED DESCRIPTION OF EMBODIMENTS

Figure 1A:
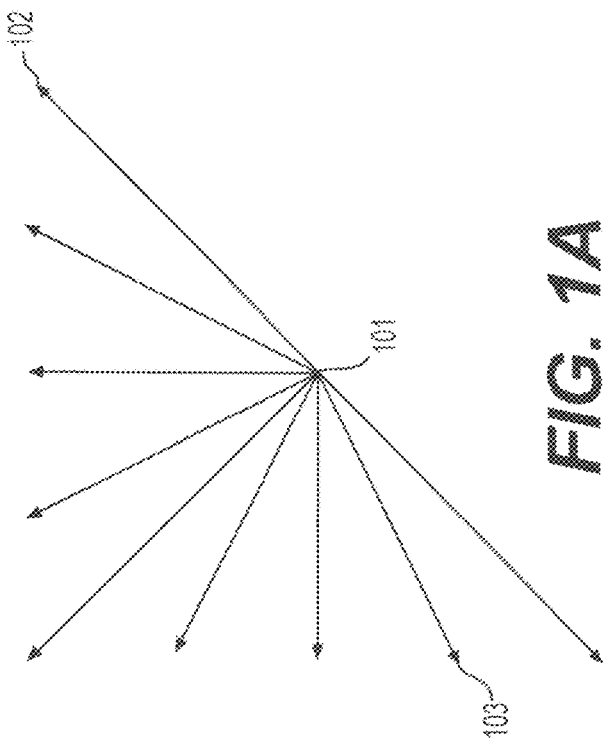
FIG. 1A is a schematic illustration or an exemplary subset of intra prediction modes.
Figure 1B:
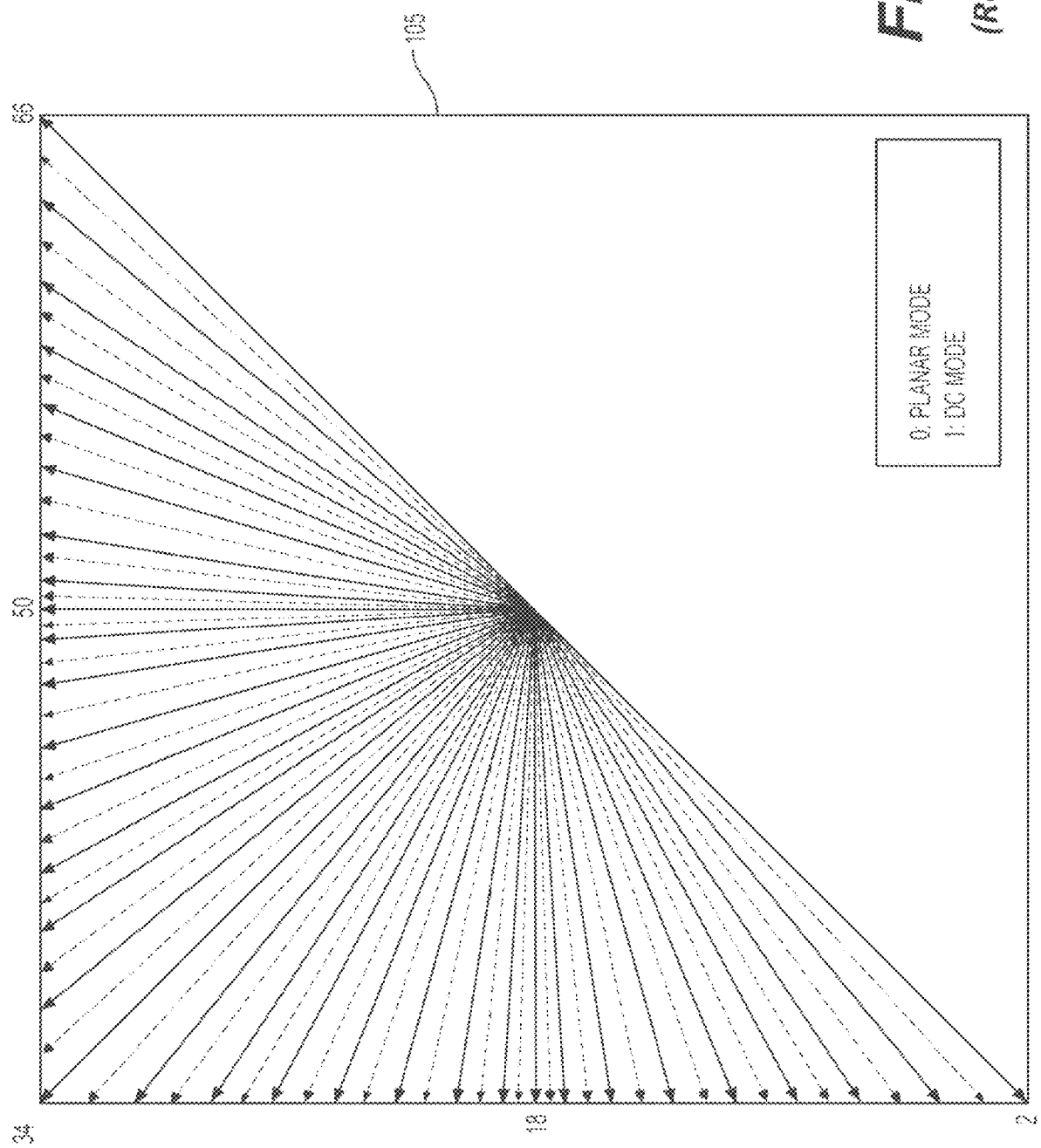
FIG. 1B is an illustration of exemplary intra prediction directions.
Figure 1D:
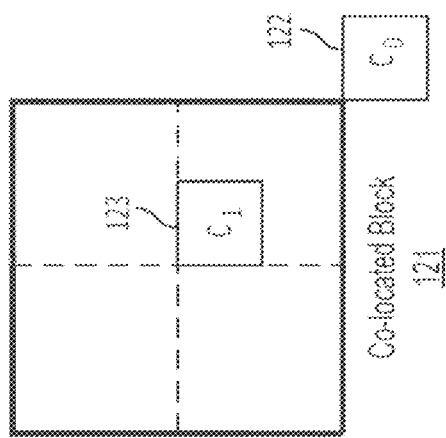
FIG. 1D is a schematic illustration of a co-located block and temporal merge candidates in one example.
Figure 1C:
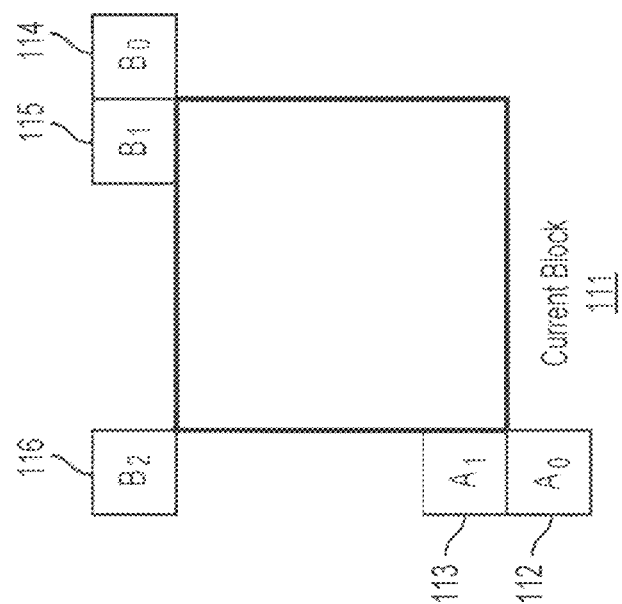
FIG. 1C is a schematic illustration of a current block and its surrounding spatial mere candidates in one example.
Figure 1E:
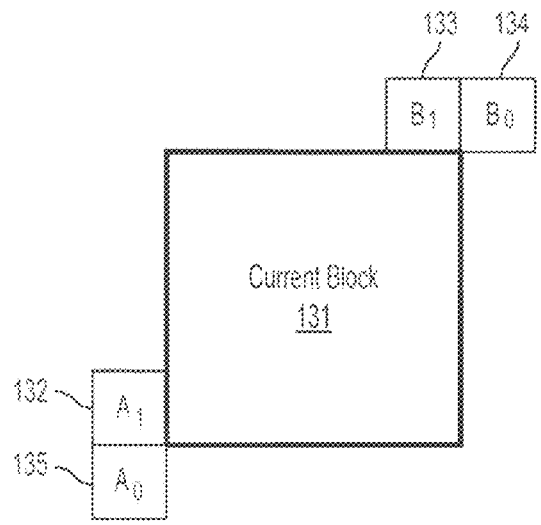
FIG. 1E is a schematic illustration of a current block and its surrounding spatial merge candidates for sub-block based temporal motion vector prediction (SbTMVP) according to one example.
Figure 1F:
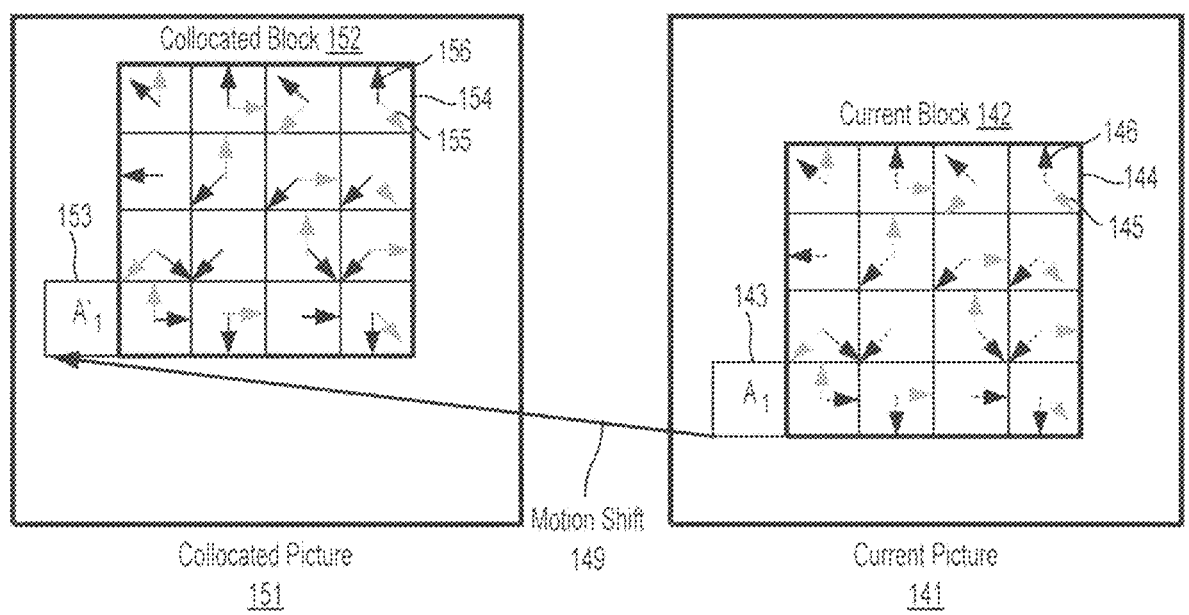
FIG. 1F is an exemplary process of deriving SbTMVP according to one example.
Figures 1G, 1H:
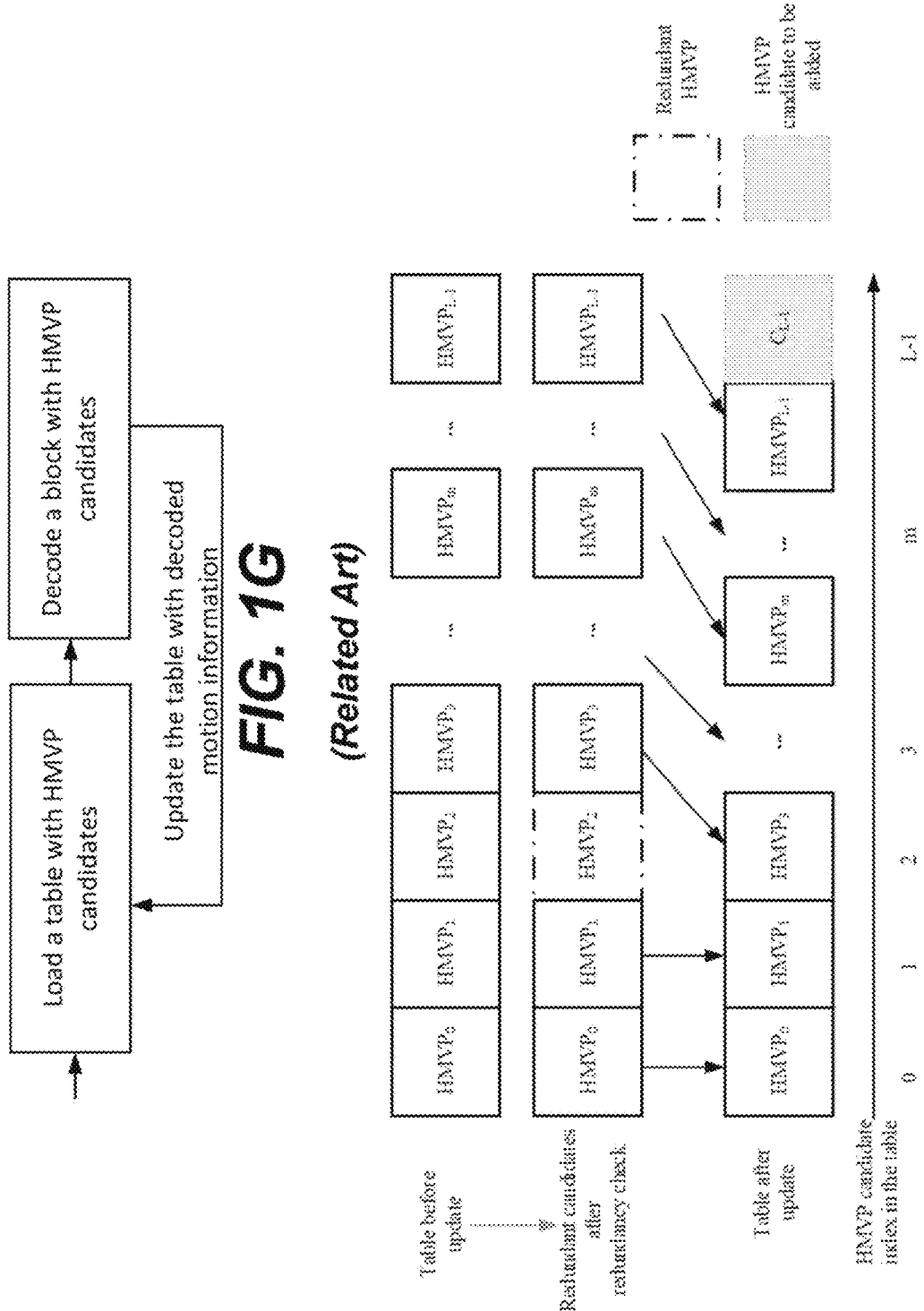
FIG. 1G is a decoding flow of a history based motion vector prediction (HMVP) method in one example.
FIG. 1H is an exemplary process of updating a table in HMVP according to one example.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
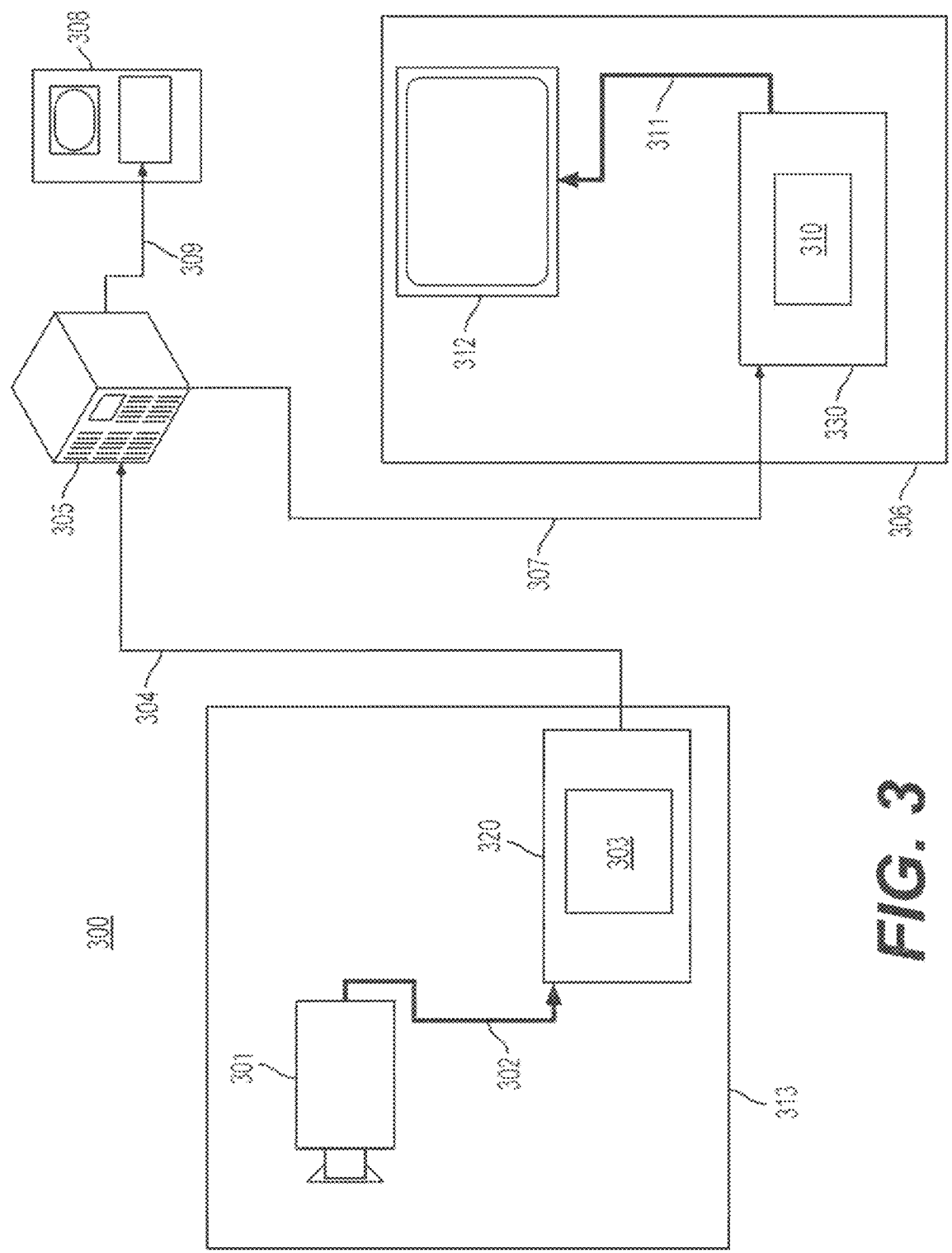
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick, and the like.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
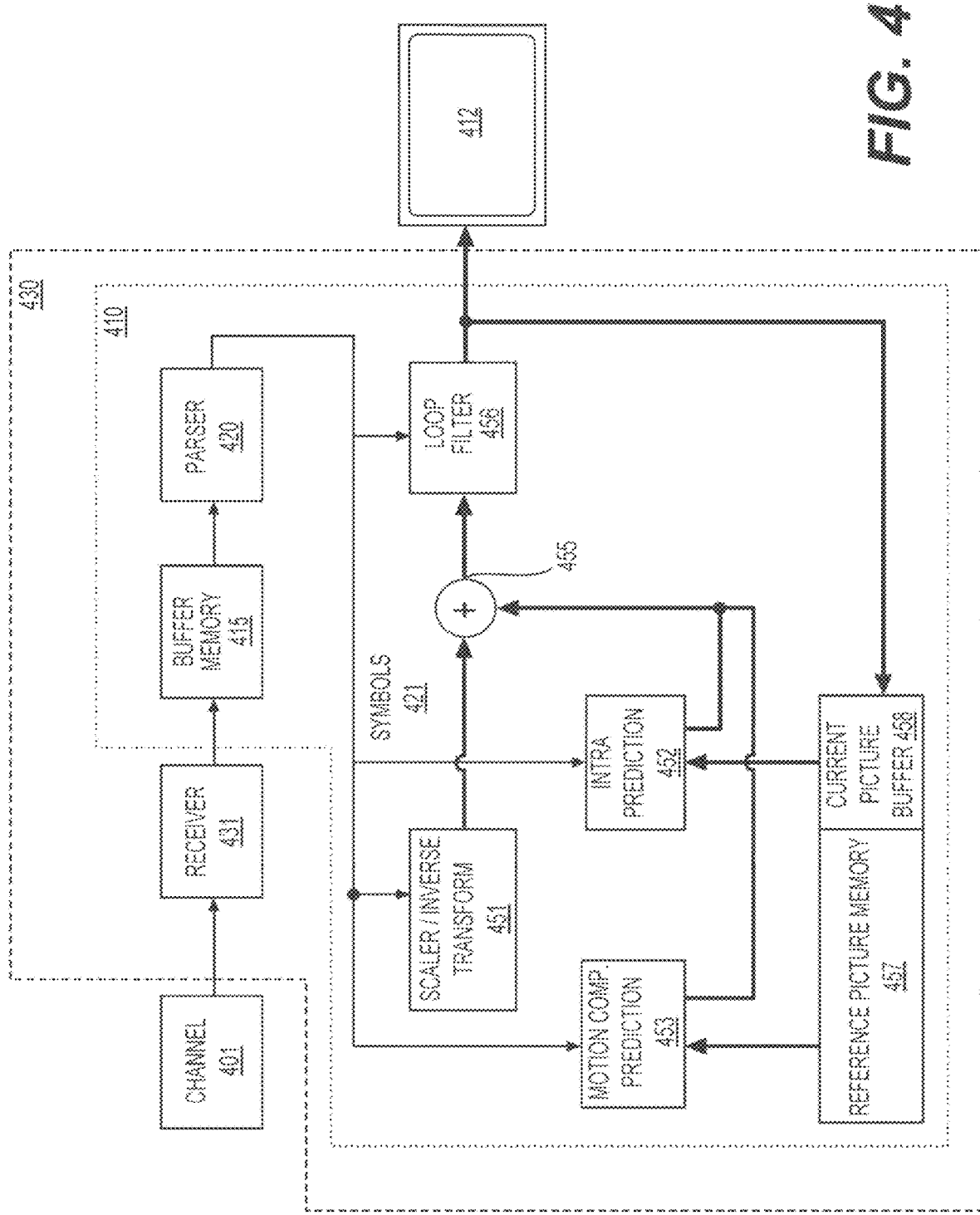
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information that the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols, (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture, corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
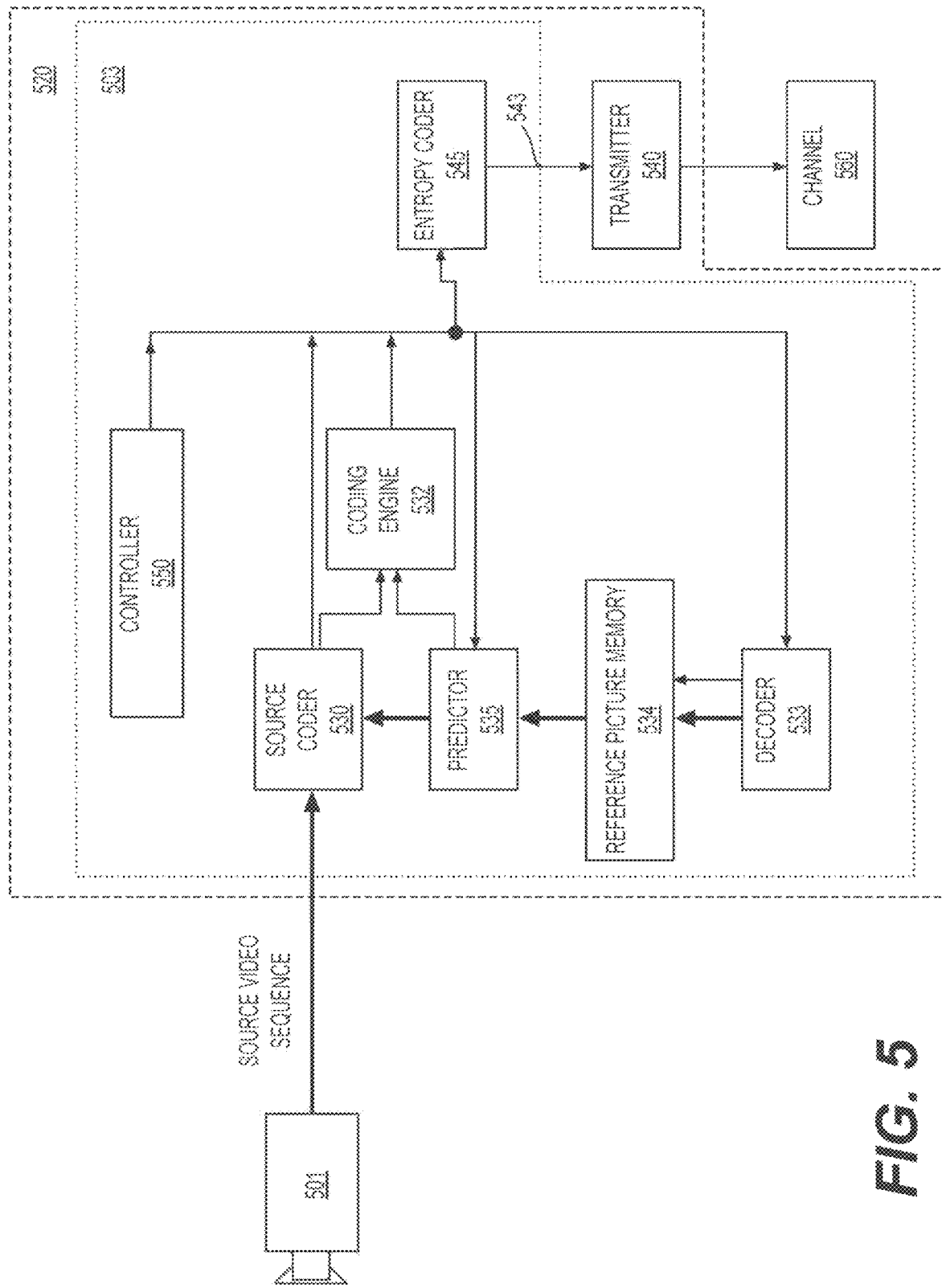
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520), The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 YCrCB, RGB, . . . ), and any suitable sampling structure (for example CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description, below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream based on an input picture to be coded, and a reference picture(s)), and a (local) decoder (533) embedded in the video encoder (503). The decoder (333) reconstructs the, symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture lion) the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5 the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (tor example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/ SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad-tree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels 8×16 pixels, 16×8 pixels, and the like.

Figure 6:
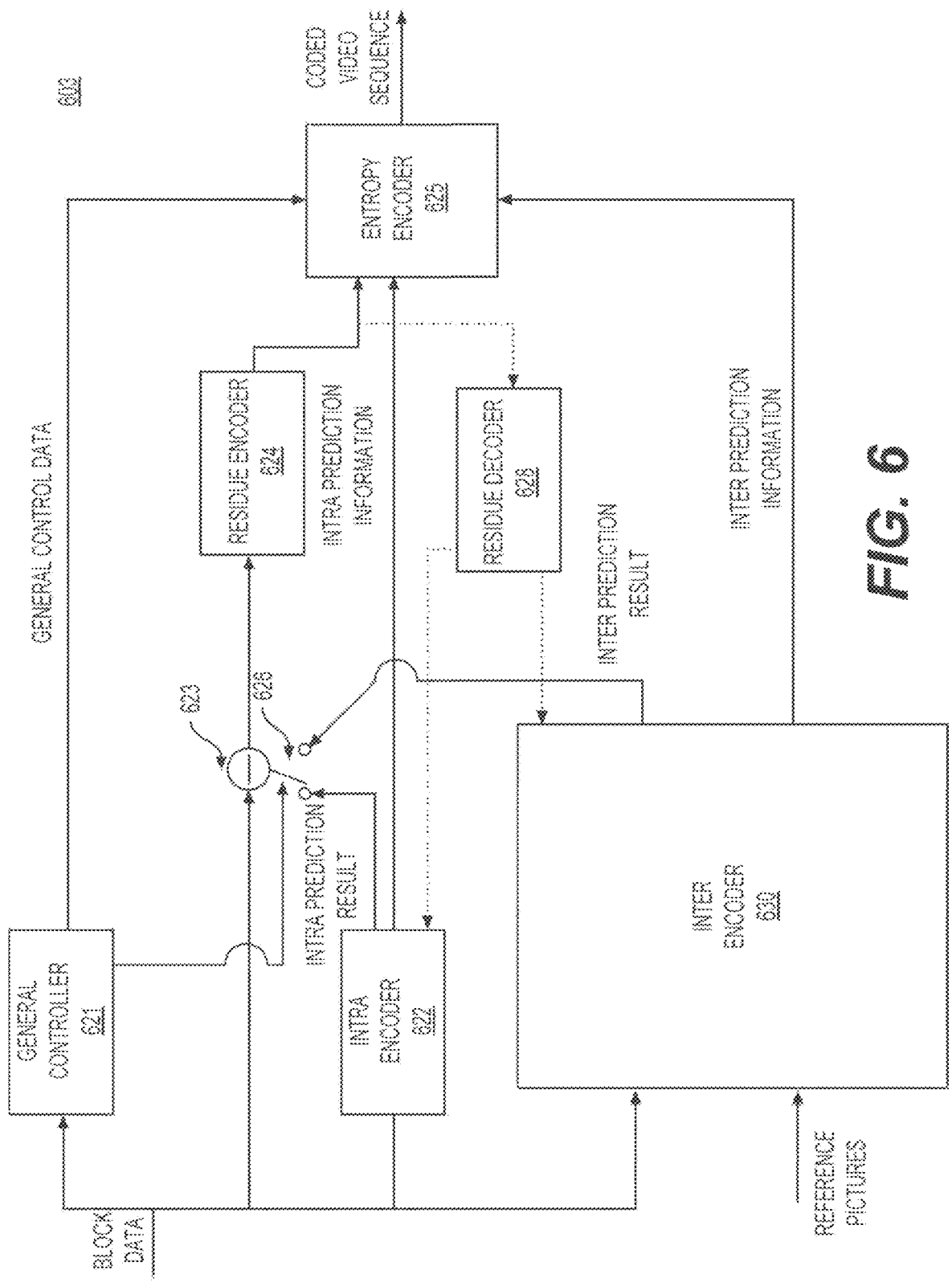
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
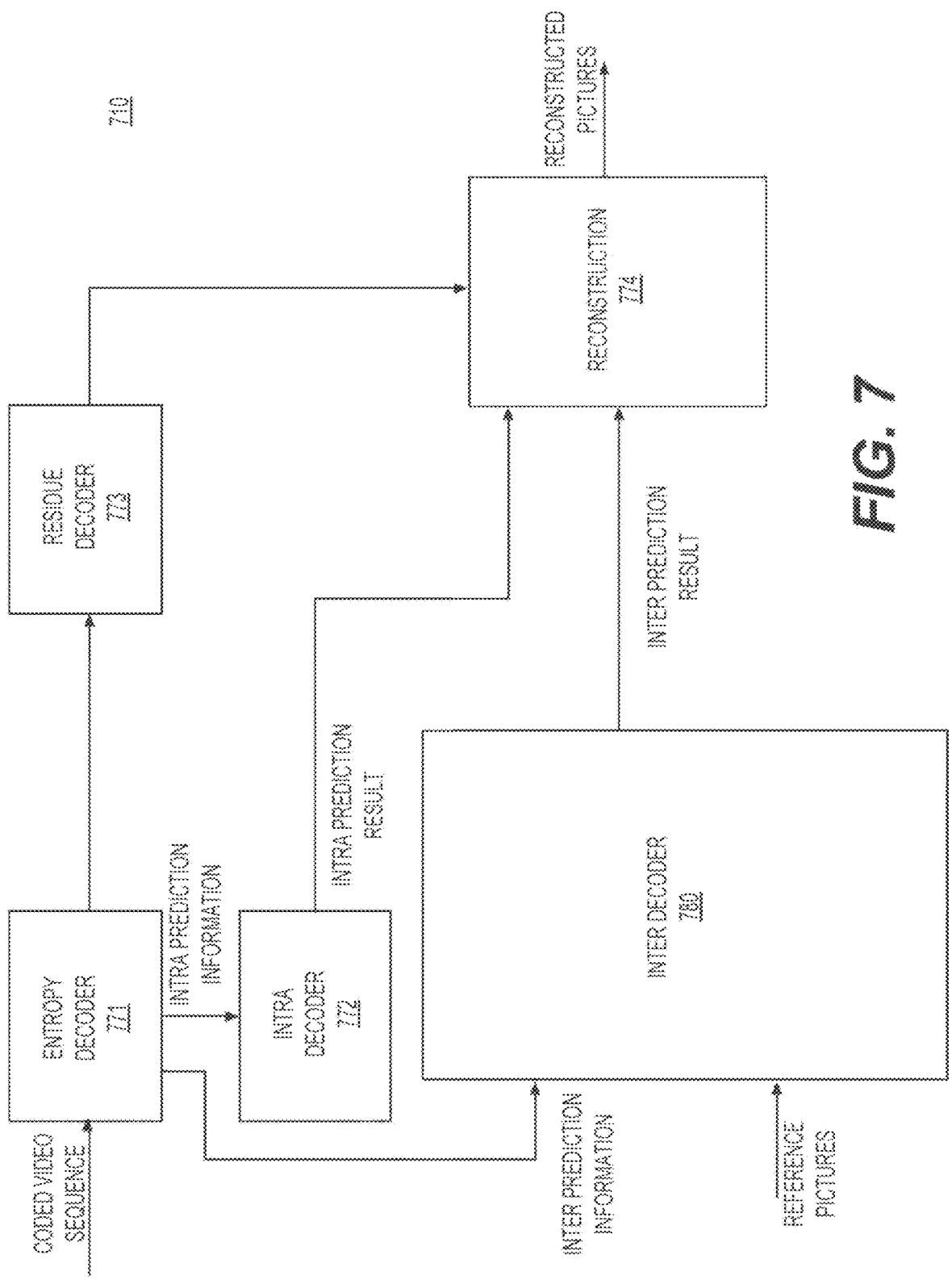
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (603), and the video decoders (310), (410), and (710) can be implemented using one or more processors that execute software instructions.

When constructing a motion vector predictor (MVP) candidate list to predict a current block, a motion vector predictor index (MVP_idx) can be signaled to select one of a plurality of MVP candidates in the MVP candidate list. Depending on the prediction mode, a motion vector difference (MVD) may be signaled, such as in AMVP mode. In addition, for AMVP mode with bi-directional prediction in which two MVP candidate lists are constructed, two MVDs can be signaled for the two MVP candidate lists, respectively. However, signaling MVDs may eliminate the possibility of using merge candidates as MVP candidates, and thus may degrade coding performance. Aspects of this disclosure includes techniques to improve coding performance for the MVP candidate list construction, for example in AMVP mode and enable more flexible MV prediction capabilities. For example, inter prediction is performed with two or more MVP candidates generated from AMVP or merge mode.

According to aspects of the disclosure, an MVP_idx is signaled for an MVP candidate list and is compared with a threshold T. In an embodiment, if N is a maximum allowed number of MVP candidates included in an MVP candidate list, for example, N=5, 6, or 7, an MVP_idx for the MVP candidate list can range from 0 to (inclusive), and a threshold T can be a non-negative integer ranging from 0 to N (inclusive). In addition, for AMVP mode with bi-directional prediction in which two MVP candidate lists are constructed and two MVDs are respectively signaled for the two MVP candidate lists, the two MVP candidate lists may share the same value of T or have different values of T. The threshold T can be a predefined number (e.g., 1, 2, or 3) which may or may not be signaled in some embodiments, or can be varied and be signaled in the coded video sequence (e.g., sequence, picture parameter, slice, or tile header) in other embodiments.

According to aspects of the disclosure, when the signaled MVP_idx is smaller than the threshold T, MVD is signaled for the MVP candidate list. The MVI) corresponds to an MVP candidate that is selected in the. MVP candidate list according to the MVP_idx. That is, the current block is predicted based on both of the MVP candidate selected by the MVP_idx and the MVD corresponding to the selected MVP candidate. When the signaled MVP_idx is equal to or larger than the threshold. T, no MVD is signaled for the MVP candidate list. That is, the MVP candidate selected by the MVP_idx is a merge candidate that can be derived without the MVD.

According to embodiments of the disclosure, a reference index (ref_idx) can be signaled to select a reference picture in a current reference list of the current block. The signaled ref_idx can be a target ref_idx, similar to that in an HEVC AMVP process.

In an embodiment, whether the ref idx is signaled depends on a number of the reference pictures in the current reference list. In an example, when more than one reference picture is available in the current reference list, the ref_idx is always signaled.

In an embodiment, whether the ref_idx is signaled depends on the availability of the MVD. In an example, the ref_idx is signaled only when the MVD is signaled.

In an embodiment, whether the ref_idx is signaled depends on a comparison between the MVP_idx and the threshold T. In an example, when the MVP_idx is smaller than the threshold T, the ref_idx is not signaled.

According to embodiments of the disclosure, when the ref_idx is not signaled, there is no target ref_idx so that motion vector scaling may not need to be performed for the selected MVP candidate indicated by the MVP_idx. In such embodiments, the ref_idx can be inferred based on the method used in HEVC merge mode. That is, the reference picture for the current inter prediction direction will be the one associated with the selected MVP candidate indicated by MVP_idx.

According to aspects of the disclosure, the MVP candidate list construction process in AMVP mode is modified such that more candidates than those in HEVC AMVP mode may be included in the MVP candidate list. For example, at least one MVP candidate is associated with a zero MVD and at least one MVP candidate is associated with a non-zero MVD. In addition, pruning may be used to avoid duplicated candidates.

In an embodiment, MVP candidates are first derived, for example, based on the method used in HEVC AMVP mode, and are then concatenated with additional MVP candidates, The additional MVP candidates can be based on one or a combination of an HEVC merge mode, an SbTMVP method, an HMVP method, a Pairwise Average MVP method, and/or a Multi-hypothesis MVP method. The additional MVP candidates can be added for each MVP candidate list.

In an embodiment, during the MVP candidate list construction, an MVP candidate is considered as invalid if an inter-prediction hypothesis of the MVP candidate conflicts with an inter-prediction hypothesis of the current MVP candidate list. That is, the inter-prediction hypothesis of the MVP candidate is different from that of the current MVP candidate list. In an example, if the inter-prediction hypothesis of the current MVP candidate list is uni-prediction and the current reference list is L1, and an MVP candidate does not have a valid L1 predictor, then the MVP candidate is considered as invalid. In another example, if the current reference list of the current MVP candidate list is L0, and one MVP candidate has both valid L0 and L1 predictors, only the L0 predictor is kept. That is, the predictor with the same inter-prediction hypothesis as the current MVP candidate list is considered as valid.

In an embodiment, during the MVP candidate list construction, when a ref_idx of an MVP candidate is different from the target ref_idx, motion vector scaling, for example as used in an HEVC TMVP process, may be used to scale the MVP candidate to the target ref_idx, or may be discarded.

In an embodiment, during the MVP candidate list construction, the MVP candidate list is not padded with zero MVs. As described above, the MVP candidate list may include merge candidates and/or other candidates (e.g., HMVP candidates, SbTMVP candidates, etc.) besides AMVP candidates. In HEVC merge mode, zero MVs may be padded when the merge list is not full. Thus, the merge candidates may include zero MVs. However, in this embodiment, when additional MVP candidates, for example based on an HEVC merge mode, are to be included into the current MVP candidate list, zero MVs are not added.

In an embodiment, during the MVP candidate list construction, when two or more MVP candidates are identical in the MVP candidate list, only the first MVP candidate remains and others are discarded in order to simplify the construction process. One of the other MVP candidates can remain and the first MVP candidate can be discarded in another embodiment.

In an embodiment, during the MVP candidate list construction, when a number of MVP candidates in the MVP candidate list is greater than a predefined number (e.g., N), only the first N candidates are kept and the rest candidates are discarded. For example, if the predefined number N is ten, then only the first ten MVP candidates are kept and the MVP candidates after the first ten MVP candidates are discarded.

In an embodiment, during the MVP candidate list construction, when a number of MVP candidates in an MVP candidate list is below a predefined number (e.g., N), zero MVs can be used to pad to the end of the MVP candidate list such that the MVP candidate list contains N candidates. Padding can be performed for each MVP candidate list.

According aspects of the disclosure, some constraints can apply to the MVP candidate list construction process. In an embodiment, when the current block has one reference picture list, the MVP_idx is limited to being smaller than the threshold T.

In an embodiment, whether the MVP_idx can be allowed to be equal to or larger than the threshold T is related to a block area of the current block. In an example, when the block area is above an area threshold, the MVP_idx is allowed to be equal to or larger than the threshold T. In another example, when the block area is below the area threshold, the MVP_idx is not allowed to be equal to or larger than the threshold T. The area threshold, for example, can be 64, 128, 356, 512, or 1024, etc.

In an embodiment, for non-merge mode, at least one MVP candidate corresponding to an MVP_idx that is smaller than the threshold T is included in the MVP candidate list.

In an embodiment, for bi-directional prediction in which two sets of MVP_idx are signaled, if the first signaled MVP_idx is equal to or larger than the threshold T, the second signaled MVP_idx is limited to be smaller than the threshold T, or vice-versa.

In an embodiment, for non-merge mode, at least one MVD is signaled. For example, in bi-prediction, if an MVD for L0 is not signaled an MVD for L1 will be signaled, or vice-versa.

Figure 8:
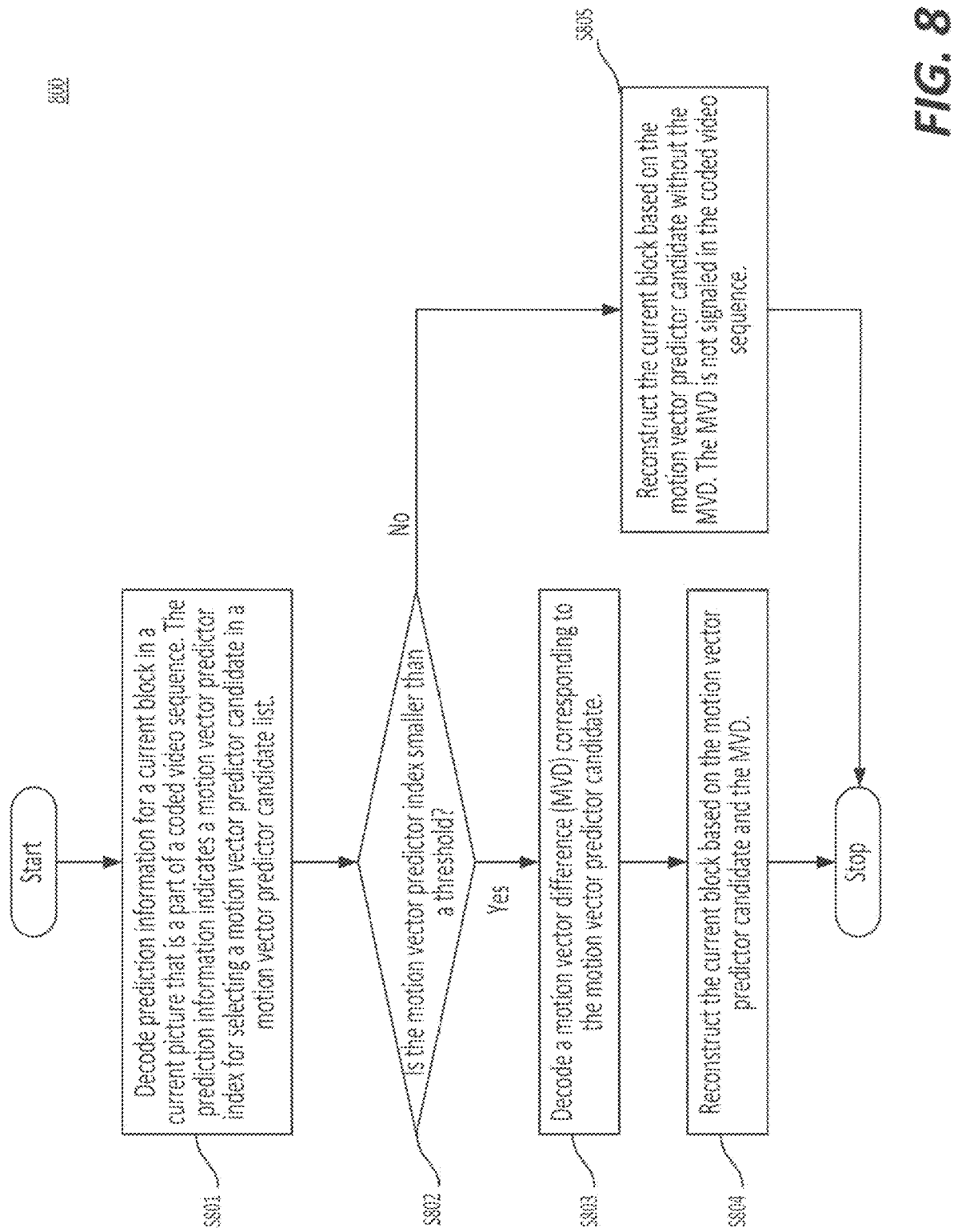
FIG. 8 shows a flowchart outlining an exemplary process according to some embodiments of the disclosure.

FIG. 8 shows a flowchart outlining an exemplary process (800) according to some embodiments of the disclosure. In various embodiments, the process (800) is executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (800) is implemented in software instructions, thus when the processing circuitry executes the software instructions, the processing circuitry performs the process (800).

The process (800) may generally start at step (S801) where the process (800) decodes prediction information for a current block in a current picture that is a part of a coded video sequence. The prediction information indicates a motion vector predictor index (MVP_idx) for selecting a motion vector predictor (MVP) candidate in a motion vector predictor candidate list. After decoding the prediction information, the process proceeds to step (S802).

At (S802), the process (800) determines whether the MVP_idx is smaller than a threshold T. When the MVP_idx is determined to be smaller than the threshold T, the process (800) proceeds to step (S803). Otherwise, the process (800) proceeds to step (S805).

At (S803), the process (800) decodes a motion vector difference (MVD) corresponding to the MVP candidate. After decoding the MVD the process (800) proceeds to step (S804).

At (S804), tine process (800) reconstructs the current block based on the MVP candidate and the MVD.

At (S805), the process (800) reconstructs the current block based on the MVP candidate without the MVD since the MVD is not signaled in the coded video sequence.

In an embodiment, the process (800) determines a reference picture in a reference picture list for the current block according to one of a reference index to the reference picture in the reference picture list and a reference picture associated with the MVP candidate.

In an embodiment, the threshold T is a preset number. In another embodiment, the threshold T is signaled in the coded video sequence.

In an embodiment, the process (800) determines whether an inter-prediction hypothesis of a new MVP candidate is different from an inter-prediction hypothesis of the MVP candidate list.

In an embodiment, the MVP_idx is smaller than the threshold T when the current block has one reference picture list.

In an embodiment, the MVP candidate list includes an MVP candidate associated with a non-zero MVD and an MVP candidate associated with a zero MVD.

After reconstructing the current block, the process (800) terminates.

According to aspects of the disclosure, techniques are provided to improve MVD coding When coding/decoding an MVD, some syntax elements associated with the MVD are coded/decoded. MVD coding, however, uses contexts to code syntax elements such as abs_mvd_greater0_flag and abvs_mvd_greater1_flag. The efficiency of these contexts is not high. Further, multiple MVD coding modules can occur during the decoding of a coding block, such as in bi-directional predication and/or affine mode with control points. The correlations among these MV DS have not been utilized.

FIG. 9A shows a syntax table for coding an MVD for list 0 (L0) or bi-prediction according to some embodiments of the disclosure, When an inter prediction mode (inter_pred_idc) of a current block is not list 1 (PRED_L1), that is, list 0 (PRED_L0) or bi-prediction (PRED_B1) is used for the current block, and the maximum reference index for list 0 (num_ref_idx_10_active_minus1) is above 0, the list 0 reference picture index (ref_idx_10) is specified and an MVD coding (mvd_coding) is performed for the current block, where the array indices x0, y0 specify the location (x0, y0) of the top-left luma sample of the current block relative to the top-left lama sample of the current picture. It is noted that a syntax table for coding an MVD for list 1 (L1) can be defined in, a similar way.

FIG. 9B shows a syntax table for an MVD coding according to some embodiments of the disclosure. Specifically, the syntax element abs_mvd_greater0_flag[compIdx] specifies whether the absolute value of a motion vector component difference is greater than 0, where compIdx=0 and 1 for x component (axis) and y component (axis), respectively. The syntax element abs_mvd_greater1_flag [compIdx] specifies whether the absolute value of a motion vector component difference is greater than 1. When abs_mvd_greater1_flag[compIdx] is not present, it can be inferred to be equal to one of the values such as 0. The syntax element abs_mvd_minus2[compIdx] plus 2 specifies the absolute value of a motion vector component difference. When abs_mvd_minus2[compIdx] is not present, it can be inferred to be equal to one of the values such as −1. The syntax element mvd_sign_flag[compIdx] specifies the sign of a motion vector component difference as follows: if mvd_sign_flag[compIdx 0, the corresponding motion vector component difference has a positive value; otherwise (e.g., mvd_sign_flag/compIdx]=1, the corresponding motion vector component difference has a negative value. When mvd_sign_flag[compIdx] is not present, it can be inferred to be equal to one of the values such as 0.

According to aspects of the disclosure, syntax elements of the MVD can be context coded. For example, the syntax elements abs_mvd_greater0_flag (e.g., 1 bin) and abs_mvd_greater1_flag (e.g., 1 bin) can be context coded, for example using Context-Based Adaptive Binary Arithmetic Coding (CABAC). The syntax element abs_mvd_minus2 can be coded, for example using first-order Exponential-Golomb binarization with equal probability. The syntax element mvd_sign_flag (e.g., 1 bin) can be coded with equal probability, for example using bypass coding. However, as noted above, the efficiency of the context coding is not high. In addition, the MVD coding module (i.e., the MVD syntax table) may be invoked multiple times during the decoding of a coded block, such as in bi-directional prediction where two MVDs may be decoded, and/or in affine mode with multiple control points, where each control point may correspond to a respective MVD.

According to aspects of the disclosure, a number of syntax elements that can be context coded is limited. According to some embodiments, the number of syntax elements that can be context coded in MVD coding can be limited to 1. For example, in FIG. 9B, the MVD coding includes four syntax elements, but no more than one syntax element is context coded. It is noted that abs_mvd_greater0_flag[0] and abs_mvd_greater0_flag[1] are regarded as one syntax element in this application, and this rule is also valid for abs_mvd_greater1_flag, abs_mvd_minus2, and mvd_sign_flag.

In an embodiment, all the syntax elements abs_mvd, greater0_flag, abs_mvd_greater1_flag, abs_mvd_minus2, and abs_mvd_minus2, and mvd_sign_flag) in MVD coding are coded without context-based model. All the syntax elements may be coded with equal probability, for example, using bypass coding.

Compared to other two syntax elements, the syntax elements abs_mvd greater0_flag and abs_mvd_ greater1_flag may be invoked more often. Accordingly, one of them can be context coded and the other one can be bypass coded.

In an embodiment, only the syntax element abs_mvd_grealer0_flag is context coded. Other syntax elements abs_mvd_greater1_flag, abs_mvd_minus2, and mvd_sign_flag may be coded with equal probability.

In an embodiment, only the syntax element abs_mvd greater1_flag is context coded. Other syntax elements abs_mvd_greater0_flag, abs_mvd_ minus2 and mvd_ sign_flag may be coded with equal probability.

FIG. 10 shows a syntax table for an MVD coding according to an embodiment of the disclosure. In this table, three syntax elements abs_mvd_greater0_flag, abs_mvd_minus1, and mvd_sign-flag, are used for MVD coding and may be context coded. The syntax element abs_mvd_minus1 plus one specifies the absolute value of a motion vector component difference, and may be binarized with a K-th order Exponential-Golomb binarization, where K may be 0, 2, or 3. K may be 1 in some embodiments.

According to some embodiments of the disclosure, a syntax element for MVD coding has a first component and a second component. The second component of the syntax element can be decoded based on the first component of the syntax element. In other words, one component of an MVD syntax element can be used as the context for coding another component of the same MVD syntax element.

In an embodiment, when the first component abs_mvd_greater0_flag[1-N] is signaled before the second component abs_mvd_ greater0_flag[N], the value of the first component abs_mvd_greater0_flag[1-N] can be used to derive the context value for the second component abs_mvd_greater0_flag[N], where N can be 0 or 1.

In an embodiment, when the first component abs_mvd_greater0_flag[1-N] is signaled before the second component abs_mvd_greater0_flag[N] and the first component abs_mvd_greater0_flag[1-N] is signaled using a value that indicates a zero MVD for the first component, then bypass coding is used to signal the second component abs_mvd_greater0_flag[N], where N can be 0 or 1.

The above embodiments can also apply to other MVD syntax elements, such as abs_mvd_greater1_flag and/or abs_mvd_minus1.

According to some embodiments of the disclosure, when the prediction information indicates a bi-directional prediction mode for the current block, i.e., the current block has a first prediction list and a second prediction list, an MVD of the second prediction list can be decoded based on a corresponding MVD of the first prediction list.

In an embodiment, an MVD syntax element of a previously decoded prediction list can be used to determine the same syntax element of a later decoded prediction list. For example, when an MVD syntax element abs_mvd_greater0_flag[N] of the first prediction list is signaled before a corresponding MVD syntax element abs_mvd_greater0_flag[N] of the second prediction list, the value of the MVD syntax element abs_mvd_greater0_flag[N] of the first prediction list can be used to derive the context value for the corresponding, MVD syntax element abs_mvd_greater0_flag[N] of the second prediction list, where N can be 0 or 1.

In an embodiment, bypass coding can be used to signal an MVD syntax element of a later coded prediction list when the same syntax element of an earlier decoded prediction list indicates a zero MVD. For example, when an MVD syntax element abs_mvd_greater0_flag[N] of the first prediction list is signaled before a corresponding syntax element abs_mvd_greater0_flag[N] of the second prediction list, and the syntax element abs_mvd_greater0_flag[N] of the first prediction list is signaled using a value that indicates a zero MVD for the syntax element abs_mvd_greater0_flag[N] of the first prediction list, then bypass coding is used to signal the corresponding syntax element abs_mvd_greater0_flag[N] of the second prediction list, where N can be 0 or 1.

The above embodiments can also apply to other MVD syntax elements, such as abs_mvd_greater1_flag and/or abs_mvd_minus1.

According to some embodiments of the disclosure, when the prediction information indicates an affine mode with at least a first control point and a second control point for the current block, an MVD of the second control point can be decoded based on a corresponding MVD of the first control point.

In an embodiment, an MVD syntax element of a previously decoded control point can be used to determine the same syntax element of a later decoded control point. For example, when an MVD syntax element abs_mvd_greater0_flag[N] of the first control point is signaled before a corresponding syntax element abs_mvd_greater0_flag[N] of the second control point, the value of the syntax element abs_mvd_greater0_flag[N] of the first control point can be used to derive the context value for the corresponding syntax element abs_mvd_greater0_flag[N] of the second control point, where N can be 0 or 1.

In an embodiment, bypass coding, can be used to signal an MVD syntax element of a later coded control point when the same syntax element of an earlier coded control point indicates a zero MVD. For example, when an MVD syntax element abs_mvd_greater0_flag[N] of the first control point is signaled before a corresponding syntax element abs_mvd_greater0_flag[N] of the second control point, and the syntax element abs_mvd_greater0_flag[N] of the first control point is signaled using a value that indicates a zero MVD for the syntax element abs_mvd_greater0_flag[N] of the first control point, then bypass coding is used to signal the corresponding syntax element abs_mvd_greater0_flag[N] of the second control point, where N can be 0 or 1.

In an embodiment, a previously signaled control point is set to be the first control point for a plurality of remaining control point(s). For example, one previously signaled control point is used to determine each of the plurality of remaining control points.

The above embodiments can also apply to other MVD syntax elements, such as abs_mvd_greater1_flag and/or abs_mvd_minus1.

According to some embodiments of the disclosure, when the prediction information indicates an affine mode with bi-directional prediction for the current block, an MVD of each control point in a first prediction list can be decoded based on an MVD of the same control point in a second prediction list. For example, when an MVD of a control point in list 0 is signaled first, an MVD of the same control point in list 1 can be predicted/context coded accordingly.

Figure 11:
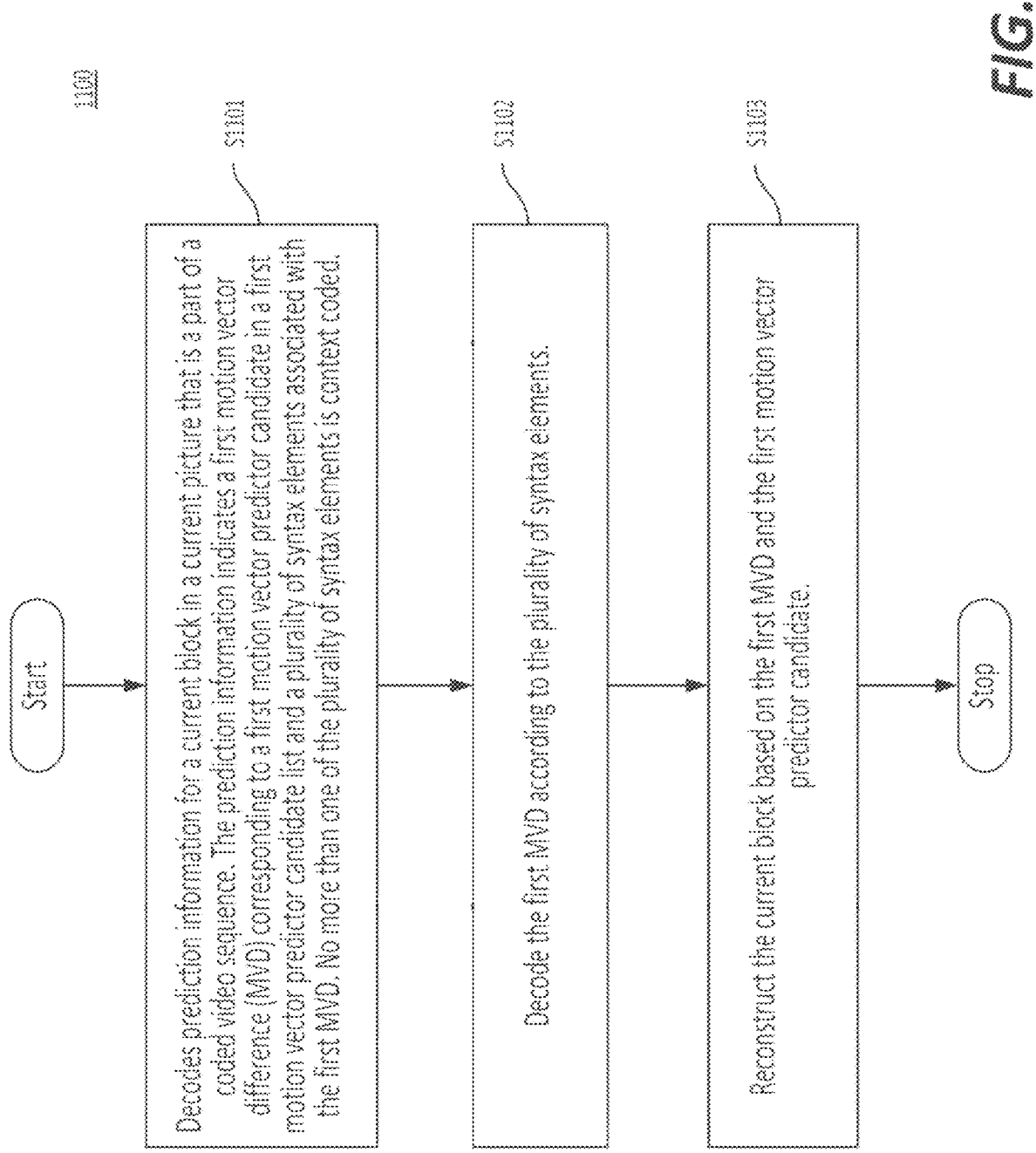
FIG. 11 shows a flowchart outlining an exemplary process according to some embodiments of the disclosure.

FIG. 11 shows a flowchart outlining an exemplary process (1100) according to some embodiments of the disclosure. In various embodiments, the process (1100) is executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1100) is implemented in software instructions, thus when the processing circuitry executes the software instructions, the processing circuitry performs the process (1100).

The process (1100) may generally start at step (S1101), where the process (1100) decodes prediction information for a current block in a current picture that is a part of a coded video sequence. The prediction information indicates a first motion vector difference (MVD) corresponding to a first motion vector predictor candidate in a first motion vector predictor candidate list and a plurality of syntax elements associated with the first MVD. No more than one of the plurality of syntax elements is context coded, according to some embodiments. In other embodiments, the number of context coded syntax elements is limited to be less than or equal to a predetermined number. For example, the number of content coded syntax elements can be limited to less than 4. In this case, the number of content coded syntax elements can be limited to no more than 1 for example when the total number of syntax elements is 4, or the number of content coded syntax elements may not need to be limited when the total number of syntax elements is 3 Then the process (1100) proceeds to step (S1102).

At step (S1102), the process (1100) decodes the first MVD according to the plurality of syntax elements. The first MVD may be decoded based on one or a combination of the processes or constraints described above. Then the process (1100) proceeds to step (S1103).

At step (S1103), the process (1100) reconstructs the current block based on the first MVD and the first motion vector predictor candidate.

In an embodiment, a total number of the plurality of syntax elements associated with the first MVD is smaller than four, In an embodiment, one of the plurality of syntax elements associated with the first MVD has a first component and a second component, and the second component is decoded based on the first component.

In an embodiment, when the prediction information indicates a bi-directional prediction mode for the current block, the process (1000) decodes a second MVD corresponding to a second motion vector predictor candidate in a second motion vector predictor candidate list based on the first MVD. The process (1100) further reconstructs the current block based on the first motion vector predictor candidate, the first MVD, the second motion vector predictor candidate, and the second MVD.

In an embodiment, when the prediction information indicates a first affine mode for the current block and the first motion vector predictor candidate corresponds to a first control point of the current block, the process (1100) decodes a third MVD corresponding to a third motion vector predictor candidate based on the first MVD. The third motion vector predictor candidate corresponds to a second control point of the current block. The process (1100) further reconstructs the current block based on the first motion vector predictor candidate, the first MVD, the third motion vector predictor candidate, and the third MVD.

In an embodiment, when the prediction information indicates a second affine mode with bi-directional prediction for the current block, the process (1100) decodes a fourth MVD corresponding to a fourth motion vector predictor candidate in a fourth motion vector predictor candidate list based on the first MVD. The fourth motion vector predictor candidate and the first motion vector predictor candidate correspond to a same control point of the current block. The process (1100) further reconstructs the current block based on the first motion vector predictor candidate, the first MVD, the fourth motion vector predictor candidate, and the fourth MVD.

After reconstructing the current block, the process (1100) terminates.

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
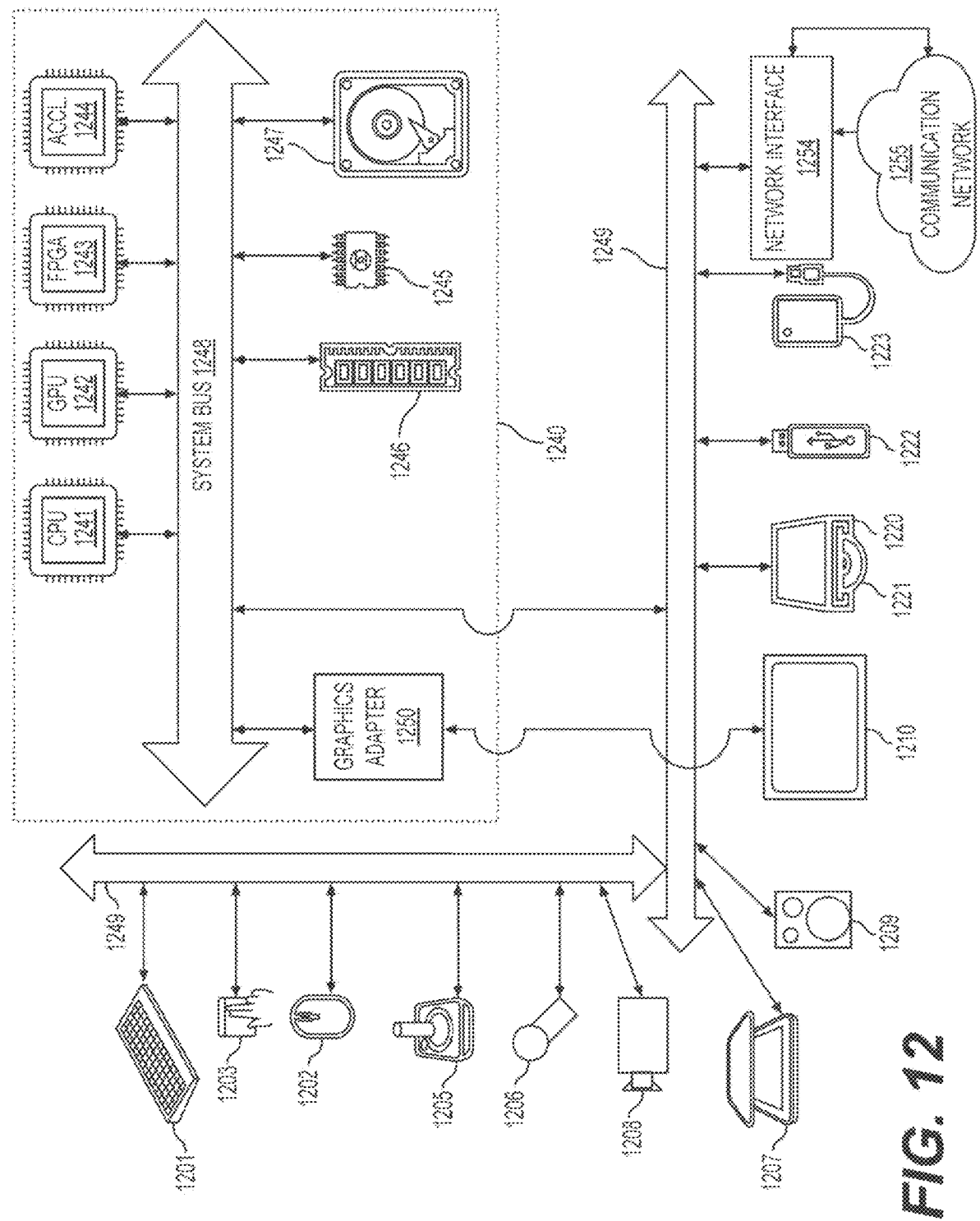
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted: keyboard (1201), mouse (1202), trackpad (1203), touch screen (1210), data-glove (not shown), joystick (1205) microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (1210)) can be connected to a system bus (1248) through a graphics adapter (1250).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dangles (not depicted), and the like.

Those skilled in the art should also understand that term "computer readable media" as used in connection with the presently disclosed subject matter does not encompass transmission media, carrier waves, or other transitory signals.

Computer system (1200) can also include a network interface (1254) to one or more communication networks (1255). The one or more communication networks (1255) can for example be wireless, wireline, optical. The one or more communication networks (1255) can further be local, wide-area, metropolitan, vehicular and industrial, real-time, delay-tolerant, and so on, Examples of the one or more communication networks (1255) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), and so forth. These devices, along with Read-only memory (ROM) (1245), Random-access memory (1246), internal mass storage such as internal non-user accessible hard drives, SSDs, and the like (1247), may be connected through the system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX

A: Acronyms
AMVP: Advanced Motion Vector Prediction
ASIC: Application-Specific Integrated Circuit
BMS: Benchmark Set
BS: Boundary Strength
BV: Block Vector
CANBus: Controller Area Network Bus
CD: Compact Disc
CPR: Current Picture Referencing
CPUs: Central Processing Units
CRT: Cathode Ray Tube
CTBs: Coding Tree Blocks
CTUs: Coding Tree Units
CU: Coding Unit
DPB: Decoder Picture Buffer
DVD: Digital Video Disc
FPGA: Field Programmable Gate Areas
GOPs: Groups of Pictures
GPUs: Graphics Processing Units
GSM: Global System for Mobile communications
HDR: High Dynamic Range
HEVC: High Efficiency Video Coding
HRD: Hypothetical Reference Decoder
IBC: Intra Block Copy
IC: Integrated Circuit
JEM: Joint Exploration Model
LAN: Local Area Network
LCD: Liquid-Crystal Display
LIC: Local Illumination Compensation
LTE: Long-Term Evolution
MR-SAD: Mean-Removed:Sum of Absolute Difference
MR-SATD: Mean-Removed Sum of Absolute Hadamard-Transformed Difference
MV: Motion Vector
OLED: Organic Light-Emitting Diode
PBs: Prediction Blocks
PCI: Peripheral Component Interconnect
PLD: Programmable Logic Device
PPS: Picture Parameter Set
PUs: Prediction Units
RAM: Random Access Memory
ROM: Read-Only Memory
SCC: Screen Content Coding
SDR: Standard Dynamic Range
SEI: Supplementary Enhancement Information
SMVP: Spatial Motion Vector Predictor
SNR: Signal Noise Ratio
SPS: Sequence Parameter Set
SSD: Solid-state Drive
TMVP: Temporal Motion Vector Predictor
TUs: Transform Units
USB: Universal Serial Bus
VUI: Video Usability Information
VVC: Versatile Video Coding

What is claimed is:

1. A method for video encoding in an encoder, comprising:
generating at least two motion vector predictor (MVP) candidate lists including motion vector predictors (MVPs) corresponding to spatial and temporal neighboring blocks of a current block according to advanced motion vector prediction (AMVP), wherein the generating the at least two MVP candidate lists according to the AMVP includes padding one of the at least two MVP candidate lists with non-zero motion vectors;
concatenating a history-based motion vector predictor (HMVP) candidate to the MVPs corresponding to the spatial and temporal neighboring blocks in the generated MVP candidate lists, the HMVP candidate is derived using an HMVP method and is a last HMVP candidate in an HMVP table, wherein a reference picture of the HMVP candidate corresponds to a reference picture of an MVP candidate list to which the HMVP candidate is concatenated;
generating prediction information for the current block in a current picture of a video sequence, the prediction information including an MVP index for each of the at least two MVP candidate lists including the HMVP candidate; and
encoding the current block based on the MVP indexes and the MVP candidate lists including the HMVP candidate.

2. The method according to claim 1, further comprising:
determining that a uni-prediction MVP has been added to a bi-prediction MVP candidate list;
based on the determination, identifying the uni-prediction MVP as invalid and removing the uni-prediction MVP from the bi-prediction MVP candidate list.

3. The method according to claim 1, further comprising:
determining that a reference index corresponding to an MVP in one of the MVP candidate lists is different from an AMVP target reference index used for generating the MVP candidate lists; and
applying motion vector scaling to scale the MVP to cause the reference index of the MVP to be the same as the AMVP target reference index.

4. The method according to claim 1, further comprising:
determining that a reference index corresponding to an MVP in one of the MVP candidate lists is different from an AMVP target reference index used for generating the MVP candidate lists; and
removing the MVP from the one of the MVP candidate lists based on the determination.

5. The method according to claim 1, further comprising:
determining that two or more MVPs in one of the MVP candidate lists are identical to each other; and
removing one or more of the identical MVPs from the one of the MVP candidate lists, such that only one of the two or more of the identical MVPs remains in the one of the MVP candidate lists.

6. The method according to claim 1, further comprising:
determining that one of the MVP candidate lists includes a number of MVPs that exceeds a threshold N; and
discarding one or more of the MVPs from the one of the MVP candidate lists such that only an initial N number of MVPs remain in the one of the MVP candidate lists.

7. The method according to claim 1, further comprising:
when one of the MVP candidate lists includes a number of MVPs that is less than a threshold N, padding the one of the MVP candidate lists with one or more zero MVPs to bring the number of MVPs in the one of the MVP candidate lists to N.

8. A video decoding apparatus, comprising:
processing circuitry configured to
generate at least two motion vector predictor (MVP) candidate lists including motion vector predictors (MVPs) corresponding to spatial and temporal neighboring blocks of a current block according to advanced motion vector prediction (AMVP), wherein one of the at least two MVP candidate lists is padded with non-zero motion vectors;

concatenate a history-based motion vector predictor (HMVP) candidate to the MVPs corresponding to the spatial and temporal neighboring blocks in the generated MVP candidate lists, the HMVP candidate is derived using an HMVP method and is a last HMVP candidate in an HMVP table, wherein a reference picture of the HMVP candidate corresponds to a reference picture of an MVP candidate list to which the HMVP candidate is concatenated;

acquire prediction information for the current block in a current picture of a video sequence, the prediction information including an MVP index for each of the at least two MVP candidate lists including the HMVP candidate; and decode the current block based on the MVP indexes and the MVP candidate lists including the HMVP candidate.

9. The apparatus according to claim 8, the processing circuitry being further configured to:

determine that a uni-prediction MVP has been added to a bi-prediction MVP candidate list;

based on the determination, identify the uni-prediction MVP as invalid and remove the uni-prediction MVP from the bi-prediction MVP candidate list.

10. The apparatus according to claim 8, the processing circuitry being further configured to:

determine that a reference index corresponding to an MVP in one of the MVP candidate lists is different from an AMVP target reference index used for generating the MVP candidate lists; and apply motion vector scaling to scale the MVP to cause the reference index of the MVP to be the same as the AMVP target reference index.

11. The apparatus according to claim 8, the processing circuitry being further configured to:

determine that a reference index corresponding to an MVP in one of the MVP candidate lists is different from an AMVP target reference index used for generating the MVP candidate lists; and remove the MVP from the one of the MVP candidate lists based on the determination.

12. The apparatus according to claim 8, the processing circuitry being further configured to:

determine that two or more MVPs in one of the MVP candidate lists are identical to each other; and remove one or more of the identical MVPs from the one of the MVP candidate lists, such that only one of the two or more of the identical MVPs remains in the one of the MVP candidate lists.

13. The apparatus according to claim 8, the processing circuitry being further configured to:

determine that one of the MVP candidate lists includes a number of MVPs that exceeds a threshold N; and discard one or more of the MVPs from the one of the MVP candidate lists such that only an initial N number of MVPs remain in the one of the MVP candidate lists.

14. The apparatus according to claim 8, the processing circuitry being further configured to:

when one of the MVP candidate lists includes a number of MVPs that is less than a threshold N, pad the one of the MVP candidate lists with one or more zero MVPs to bring the number of MVPs in the one of the MVP candidate lists to N.

15. A method of processing visual media data, the method comprising:

processing a bitstream that includes the visual media data according to a format rule, wherein the bitstream includes coding information of a current block, the format rule specifies that at least two motion vector predictor (MVP) candidate lists are generated, the at least two MVP candidate lists including motion vector predictors (MVPs) corresponding to spatial and temporal neighboring blocks of a current block according to advanced motion vector prediction (AMVP), wherein one of the at least two MVP candidate lists is padded with non-zero motion vectors;

a history-based motion vector predictor (HMVP) candidate is concatenated to the MVPs corresponding to the spatial and temporal neighboring blocks in the generated MVP candidate lists, the HMVP candidate is derived using an HMVP method and is a last HMVP candidate in an HMVP table, wherein a reference picture of the HMVP candidate corresponds to a reference picture of an MVP candidate list to which the HMVP candidate is concatenated;

prediction information for a current block in a current picture of a video sequence is acquired, the prediction information including an MVP index for each of the at least two MVP candidate lists including the HMVP candidate; and the current block is coded based on the MVP indexes and the MVP candidate lists including the HMVP candidate.

16. The method according to claim 15, the method further comprising:

determining that a reference index corresponding to an MVP in one of the MVP candidate lists is different from an AMVP target reference index used for generating the MVP candidate lists; and applying motion vector scaling to scale the MVP to cause the reference index of the MVP to be the same as the AMVP target reference index.

17. The method according to claim 15, the method further comprising:

determining that a reference index corresponding to an MVP in one of the MVP candidate lists is different from an AMVP target reference index used for generating the MVP candidate lists; and removing the MVP from the one of the MVP candidate lists based on the determination.

18. The method according to claim 15, the method further comprising:

determining that a uni-prediction MVP has been added to a bi-prediction MVP candidate list;

based on the determination, identifying the uni-prediction MVP as invalid and removing the uni-prediction MVP from the bi-prediction MVP candidate list.

\* \* \* \* \*